United States Patent
Delp

(10) Patent No.: US 10,124,688 B2
(45) Date of Patent: Nov. 13, 2018

(54) SYSTEMS AND METHODS FOR RENDEZVOUSING WITH AN AUTONOMOUS MODULAR VEHICLE TO PROVIDE ENERGY

(71) Applicant: Toyota Research Institute, Inc., Los Altos, CA (US)

(72) Inventor: Michael J. Delp, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 40 days.

(21) Appl. No.: 15/453,608

(22) Filed: Mar. 8, 2017

(65) Prior Publication Data
US 2018/0257498 A1    Sep. 13, 2018

(51) Int. Cl.
| B60L 11/18 | (2006.01) |
| G05D 1/02 | (2006.01) |
| G01C 21/34 | (2006.01) |
| G01C 22/00 | (2006.01) |

(52) U.S. Cl.
CPC ...... *B60L 11/1822* (2013.01); *G01C 21/3415* (2013.01); *G01C 21/3438* (2013.01); *G05D 1/0225* (2013.01); *B60L 2200/28* (2013.01); *B60L 2240/60* (2013.01)

(58) Field of Classification Search
CPC .............. B60L 11/1822; B60L 2200/28; B60L 2240/60; G01C 21/3415; G01C 21/3438; G05D 1/0225
USPC .................................................. 701/26, 400
See application file for complete search history.

(56) References Cited

U.S. PATENT DOCUMENTS

| 3,308,845 | A | 3/1967 | Bellas et al. |
| 6,059,058 | A | 5/2000 | Dower |
| 7,798,449 | B2 | 9/2010 | Small et al. |
| 8,538,694 | B2 | 9/2013 | Conway |
| 8,676,430 | B1 * | 3/2014 | Ferguson ............ G05D 1/0274 340/435 |
| 9,193,277 | B1 | 11/2015 | Penilla et al. |
| 9,346,560 | B2 | 5/2016 | Wang |
| 9,352,728 | B2 | 5/2016 | Corlitsen |
| 2007/0113921 | A1 | 5/2007 | Capillo |
| 2008/0059007 | A1 * | 3/2008 | Whittaker ............ G05D 1/0274 701/2 |
| 2012/0005031 | A1 | 1/2012 | Jammer |

(Continued)

*Primary Examiner* — Gertrude Arthur Jeanglaude
(74) *Attorney, Agent, or Firm* — Christopher G. Darrow; Darrow Mustafa PC

(57) ABSTRACT

System, methods, and other embodiments described herein relate to determining rendezvous locations and autonomously swapping a resupply carriage with a vehicle along a route. In one embodiment, a method includes in response to a request for resupplying the vehicle with energy, determine a rendezvous point for meeting the vehicle with a resupply carriage. The method includes dispatching the resupply carriage to meet the vehicle at the rendezvous point by providing an electronic signal to the resupply carriage to cause the resupply carriage to autonomously travel to the rendezvous point. The method includes controlling the vehicle to swap a current carriage for the resupply carriage to supply energy to the vehicle. The vehicle is comprised of a passenger compartment that is removably attached to the current carriage. The current carriage and the resupply carriage are interchangeable propulsion sources for the vehicle.

20 Claims, 5 Drawing Sheets

(56) References Cited

U.S. PATENT DOCUMENTS

| | | |
|---|---|---|
| 2012/0303259 A1 | 11/2012 | Prosser |
| 2015/0248131 A1* | 9/2015 | Fairfield .............. G05D 1/0044 701/2 |
| 2015/0307068 A1 | 10/2015 | Gaffoglio et al. |
| 2016/0052404 A1 | 2/2016 | Enomoto |
| 2016/0334230 A1* | 11/2016 | Ross .................. G01C 21/3415 |
| 2016/0357262 A1* | 12/2016 | Ansari .................... G06F 3/017 |

* cited by examiner

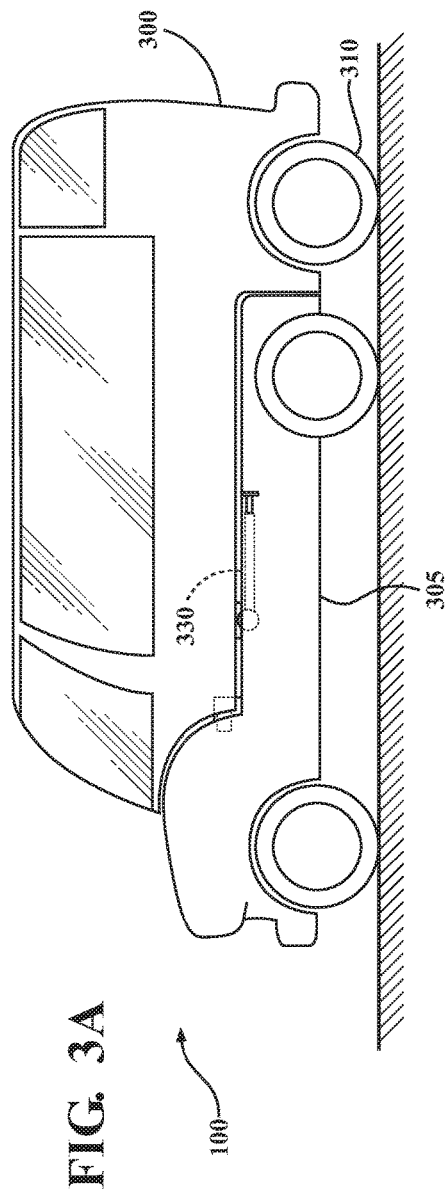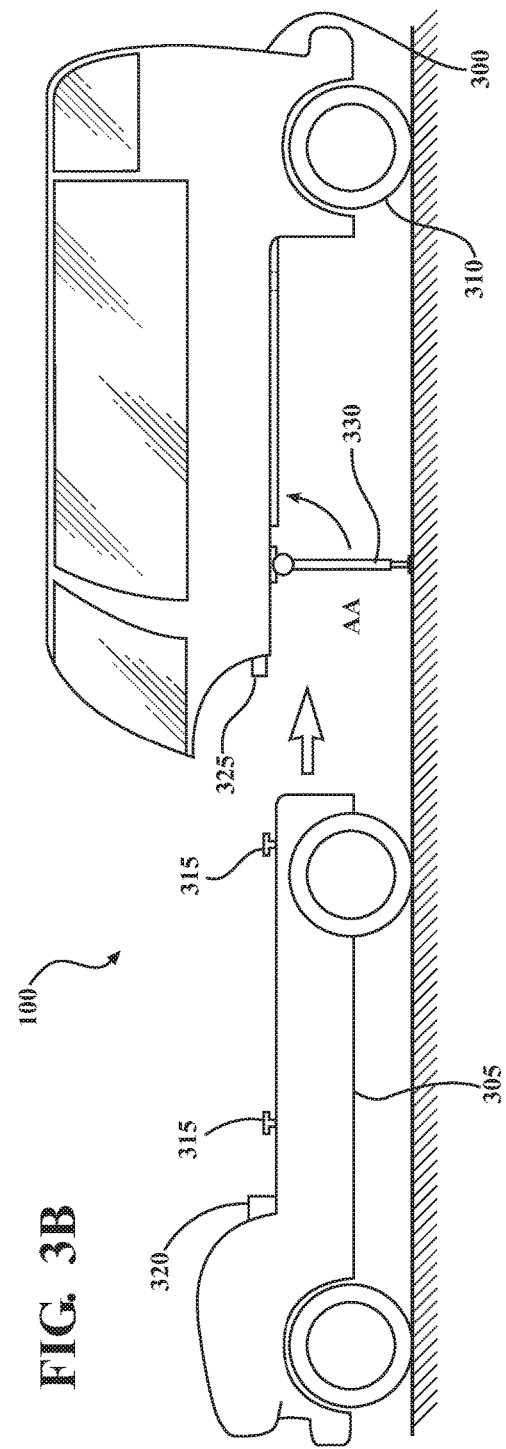
FIG. 3A
FIG. 3B

SYSTEMS AND METHODS FOR RENDEZVOUSING WITH AN AUTONOMOUS MODULAR VEHICLE TO PROVIDE ENERGY

TECHNICAL FIELD

The subject matter described herein relates in general to systems and methods for autonomously providing energy to a modular vehicle and, more particularly, to coordinating a rendezvous point with the modular vehicle to resupply the vehicle with energy by swapping out an autonomous carriage module of the modular vehicle.

BACKGROUND

Refueling a vehicle during a trip can be a significant source of wasted time due to time spent locating a refueling station, deviating from a route to travel to the refueling station, acquiring fuel, and so on. Moreover, as vehicles transition to alternative energy sources such as hydrogen and electric the time spent locating fuel and/or service stations can be exacerbated. For example, both hydrogen and electric refueling/recharging stations are rare in comparison to gasoline refueling stations. Thus, possible routes may be constrained according to the availability of a refueling/recharging stations for vehicles using these energy sources. Additionally, time delays from recharging an electric vehicle can be several hours or more causing even greater delays along a trip.

Furthermore, with the advent of autonomous vehicles that are capable of self-driving without input from a human driver, additional difficulties can be introduced in relation to refueling/recharging. For example, a passenger/driver of the autonomous vehicle may be distracted from operating conditions of the vehicle while in route since the autonomous vehicle does not use the input of the passenger. Thus, the passenger/driver can focus on other tasks such as work or entertainment. However, because the passenger/driver is distracted from the autonomous vehicle, in some circumstances, the vehicle may run out of energy (e.g., gas or electric charge). Accordingly, ensuring the vehicle is fueled/charged in a timely fashion and that the vehicle is not stranded as a result of running out of energy presents difficulties that are addressed herein.

SUMMARY

An example of a planning system that routes an autonomous modular vehicle to rendezvous points along a trip for swapping a removable carriage of the vehicle in order to refuel/recharge while the vehicle is in route is presented herein. In one embodiment, the planning system receives a request to determine one or more rendezvous points when, for example, the vehicle is low on fuel/charge and/or upon receiving a planned destination. The planning system determines the one or more rendezvous points according to a range of the vehicle as defined according to a current level of energy, a distance of available rendezvous points from distribution centers for resupplying carriages, and so on. Thus, the planning system controls a route of the autonomous vehicle according to the one or more rendezvous points and, once arriving at a rendezvous point, controls the vehicle to swap a current removable carriage for a fueled/charged removable carriage. In this way, the planning system can improve refueling/recharging of the autonomous vehicle regardless of an energy source.

In one embodiment, a planning system of a vehicle is disclosed. The planning system includes one or more processors and a memory that is communicably coupled to the one or more processors. The memory stores a route module that includes instructions that when executed by the one or more processors cause the one or more processors to, in response to a request for resupplying the vehicle with energy, determine a rendezvous point for meeting the vehicle with a resupply carriage. The route module includes instructions to dispatch the resupply carriage to meet the vehicle at the rendezvous point by providing an electronic signal to the resupply carriage to cause the resupply carriage to autonomously travel to the rendezvous point. The route module includes instructions to control the vehicle to swap a current carriage for the resupply carriage to supply energy to the vehicle. The vehicle is comprised of a passenger compartment that is removably attached to the current carriage. The current carriage and the resupply carriage are interchangeable propulsion sources for the vehicle.

In one embodiment, a non-transitory computer-readable medium is disclosed. The computer-readable medium stores instructions that when executed by one or more processors cause the one or more processors to perform the disclosed functions. The instructions include instructions to, in response to a request for resupplying a vehicle with energy, determine a rendezvous point for meeting the vehicle with a resupply carriage. The instructions include instructions to dispatch the resupply carriage to meet the vehicle at the rendezvous point by providing an electronic signal to the resupply carriage to cause the resupply carriage to autonomously travel to the rendezvous point. The instructions include instructions to control the vehicle to swap a current carriage for the resupply carriage to supply energy to the vehicle. The vehicle is comprised of a passenger compartment that is removably attached to the current carriage. The current carriage and the resupply carriage are interchangeable propulsion sources for the vehicle.

In one embodiment, a method of resupplying a vehicle is disclosed. The method includes, in response to a request for resupplying the vehicle with energy, determining a rendezvous point for meeting the vehicle with a resupply carriage. The method includes dispatching the resupply carriage to meet the vehicle at the rendezvous point by providing an electronic signal to the resupply carriage to cause the resupply carriage to autonomously travel to the rendezvous point. The method includes controlling the vehicle to swap a current carriage for the resupply carriage to supply energy to the vehicle. The vehicle is comprised of a passenger compartment that is removably attached to the current carriage. The current carriage and the resupply carriage are interchangeable propulsion sources for the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 3A and 3B are schematic representations of an autonomous modular vehicle.

DETAILED DESCRIPTION

Systems, methods and other embodiments associated with determining rendezvous locations to swap a charged/fueled resupply carriage along a route are disclosed. As previously mentioned, refueling/recharging a vehicle can present difficulties. Specifically, refueling/recharging a hydrogen or electric vehicle may present difficulties associated with both locating a refueling/recharging station and with an amount of time to perform the refueling/recharging. Moreover, ensuring an autonomous vehicle does not run out of fuel/charge and become stranded may also cause difficulties.

Therefore, in one embodiment, a planning system determines rendezvous points along a route of a vehicle where the vehicle is refueled/recharge while in route. For example, in one embodiment, the planning system receives a request to determine a rendezvous point whenever the vehicle is, for example, directed to travel to a destination and/or when a low fuel/charge condition is detected. In either case, the planning system calculates a rendezvous point, requests a fueled/charged resupply carriage to meet the vehicle at the rendezvous point, and autonomously swaps a current depleted carriage with the fueled carriage so that the vehicle may continue along a route without detouring to a service station to refuel/recharge.

Additionally, the vehicle itself is, in one embodiment, an autonomous modular vehicle that is comprised of a separate removable carriage (also referred to as an engine module or resupply carriage) and a passenger compartment (also referred to as a passenger module). In one embodiment, the vehicle is a modular vehicle as described in U.S. patent application Ser. No. 15/239,071, which is incorporated herein by reference. As will be discussed in greater detail subsequently, the autonomous modular vehicle is designed such that the removable carriage includes, for example, wheels, a propulsion system (i.e., engine, transmission, drivetrain), fuel/energy storage, wheels, and additional systems for operating/controlling the vehicle. Furthermore, in one embodiment, the removable carriage includes various sensors along with additional hardware for autonomously controlling the removable carriage separate from the passenger compartment of the vehicle. Accordingly, a fully fueled/charged carriage can be separately dispatched to rendezvous with the autonomous modular vehicle and replace a depleted carriage that is presently docked with the passenger compartment. In this way, the vehicle is refueled/charged by swapping the removable carriage at the determined rendezvous point and thus improving the expediency of resupplying the vehicle with energy.

Figure 1:
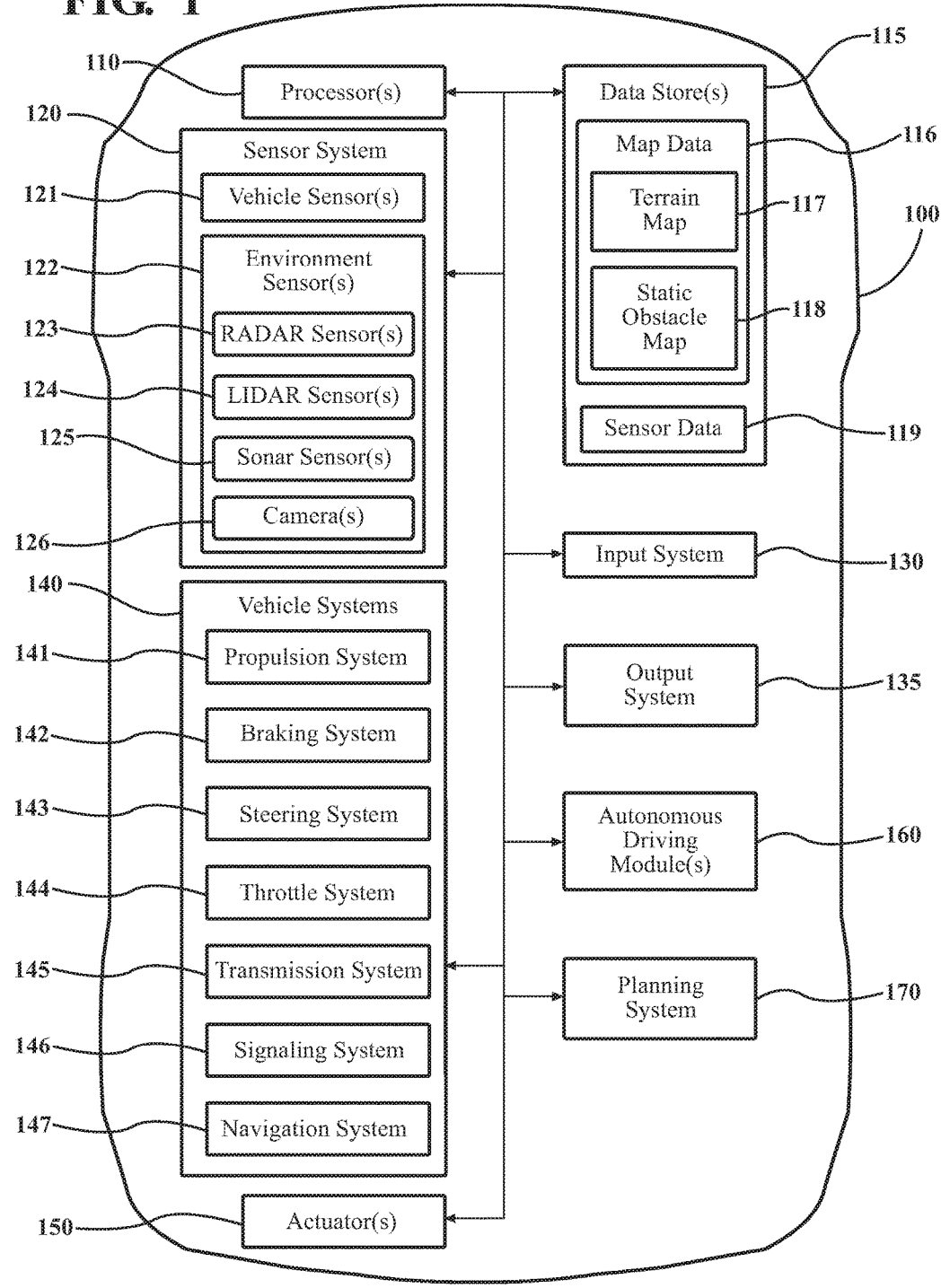
FIG. 1 illustrates one embodiment of an autonomous modular vehicle within which systems and methods disclosed herein may be implemented.

Referring to FIG. 1, an example of a vehicle 100 is illustrated. As used herein, a "vehicle" is a form of motorized transport that is embodied by joining/docking at least two separate portions including a separate passenger module and a removable carriage together. In one or more implementations, the vehicle 100 is an automobile or is otherwise referred to as an autonomous modular vehicle. Furthermore, while arrangements will be described herein with respect to automobiles, it will be understood that embodiments are not limited to automobiles. In some implementations, the vehicle 100 may be any other form of motorized transport that includes separate passenger and carriage modules that when detachably joined together form a singular vehicle.

Additionally, the vehicle 100 is illustrated in FIG. 1 as including various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances. Moreover, while the various elements of FIG. 1 are illustrated in a combined configuration, in various embodiments, the illustrated elements are integrated as part of the resupply/removable carriage, the passenger module, and/or in duplicate within both.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a planning system 170 that is implemented to perform methods and other functions as disclosed herein relating to determining rendezvous points for swapping removable resupply carriages from the vehicle 100 in order to refuel/recharge the vehicle 100. The noted functions and methods will become more apparent with a further discussion of the figures.

Figure 2:
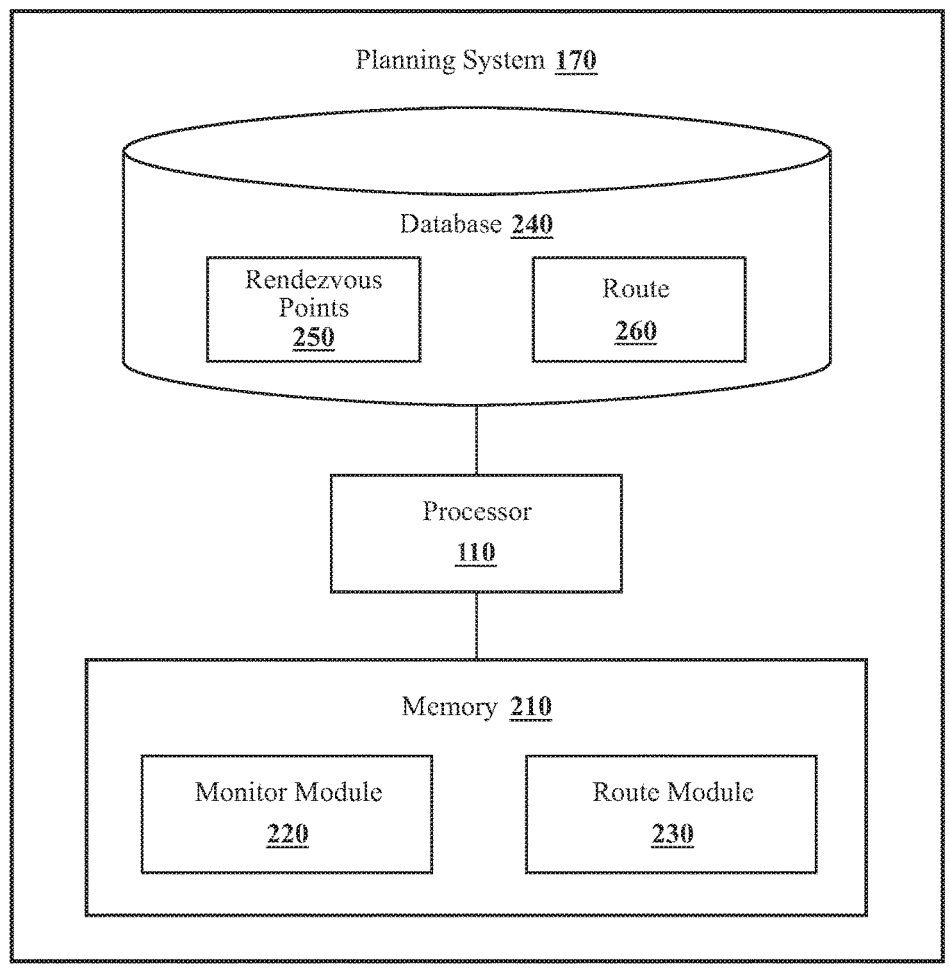
FIG. 2 illustrates one embodiment of a planning system that is associated with determining rendezvous locations to swap a charged/fueled resupply carriage with a current removable carriage along a route.

With reference to FIG. 2, one embodiment of the planning system 170 of FIG. 1 is further illustrated. The planning system 170 is shown as including the processor 110 from the vehicle 100 of FIG. 1. Accordingly, the processor 110 may be a part of the planning system 170, the planning system 170 may include a separate processor from the processor 110 of the vehicle 100, or the planning system 170 may access the processor 110 through a data bus or another communication path. In one embodiment, the planning system 170 includes a memory 210 that stores a monitor module 220 and a control module 230. The memory 210 is a random-access memory (RAM), read-only memory (ROM), a hard-disk drive, a flash memory, a distributed memory, a cloud-based memory that is connected via a network connection, or other suitable memory for storing the modules 220 and 230. The modules 220 and 230 are, for example, computer-readable instructions that when executed by the processor 110 cause the processor 110 to perform the various functions disclosed herein. Thus, as provided herein, the route module 230 may be embodied within a carriage of the vehicle 100, within a passenger compartment of the vehicle 100, within a freight compartment of the vehicle 100, and/or remotely within one or more remote devices of a cloud-based service.

The monitor module 220 generally includes instructions that function to control the processor 110 to identify various requests. In one embodiment, the monitor module 220 includes instructions to identify a request for a single upcoming rendezvous point and/or for multiple different rendezvous points along a planned route. For example, the navigation system 147 receives a destination that is electronically input by a user. The navigation system 147 can then generate a request to the planning system 170 that identifies the destination, which is used by the planning system 170 to determine the rendezvous points.

Additionally, in one embodiment, the monitor module 220 also monitors for various conditions of the vehicle 100 and generates requests internally to initiate the process of identifying a rendezvous point and dispatching a resupply carriage. For example, in one embodiment, the monitor module 220 monitors for low fuel/charge conditions and/or mechanical problems (e.g., tire pressure, engine heat level, check engine conditions, etc.) and generates the requests accordingly. Thus, the planning system 170 can account for various conditions of the vehicle 100 to improve travel and avoid delays.

Additionally, in one embodiment, the route module 230 includes instructions that function to control the processor 110 to determine rendezvous points along a route and call for or otherwise dispatch fueled removable carriages to the rendezvous points. For example, the route module 230 analyzes a route 260 generated by the navigation system 147 according to a range of the current removable carriage. The current range is a function of a level of energy remaining in the current carriage. Moreover, the route module 230, in one embodiment, also accounts for preferred locations (e.g., rest stops), a distance from a carriage depot, an amount of deviation from the route 260, additional amenities indicated in the request (e.g., bathrooms, food, etc.), traffic conditions, and so on. The route module 230 weighs the different factors and dynamically calculates a rendezvous point 250 according to, for example, a best-fit with the indicated circumstances.

With continued reference to the planning system 170, in one embodiment, the system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various determinations. In one embodiment, the database 240 includes lookup tables of available rendezvous points 250, a current route 260, additional planned routes, passenger preferences, and so on.

The rendezvous points 250 are, for example, geographic locations that are accessible by the vehicle 100. Accordingly, in one embodiment, the rendezvous points 250 may be roadside locations (e.g., highway burms), parking lots, driveways, service stations, and so on. Thus, the rendezvous points 250 are generally embodied as, for example, a geographic location (e.g., longitude and latitude) along with at least an identifier. Additionally, the rendezvous points 250 can have various associated attributes. In one embodiment, the attributes include a type of location (e.g., parking lot, service station, roadside, etc.), additional amenities associated with the rendezvous point (e.g., restrooms, etc.), a safety rating (e.g., exposure to oncoming traffic, crime, etc.), a user preference rating, and so on. Additionally, while the rendezvous points 250 are illustrated as being stored within the database 240, in one embodiment, the database 240 and the rendezvous points 250 are stored in distributed memory that is part of a cloud computing system. Accordingly, the planning system 170 accesses the rendezvous points using, for example, a network connection. Moreover, in one embodiment, the rendezvous points 250 are maintained as part of a crowd-sourced service within which feedback is maintained about the rendezvous points 250 from a plurality of users. In further embodiments, the rendezvous points 250 are dynamically generated as a function of, for example, factors relating to at least a range of the vehicle 100.

Thus, the rendezvous points 250 provide for locations at which the vehicle 100 can meet a fueled/charted resupply carriage and swap a current removable carriage for the fueled/charged carriage. In this way, delays from recharging/refueling, finding a service station, and so on can be avoided thereby providing for an improved travel experience. Additional aspects of determining rendezvous points and swapping removable carriages will be discussed in greater detail subsequently. However, to better understand the autonomous modular vehicle 100, additional discussion is provided in relation to FIGS. 3A and 3B. FIG. 3A illustrates one embodiment of the vehicle 100 in a docked configuration. In other words, as shown in FIG. 3A a passenger compartment/module 300 is mated with a removable carriage 305 (also referred to as a resupply carriage herein) to form the vehicle 100. Additionally, in further embodiments, it should be understood that the passenger compartment/module can be replaced by a freight compartment or other module to transport a load that is something other than a person. For example, the removable carriage 305 can be mated with a flat-bed hauler for transporting logs, vehicles, and so on. Moreover, the removable carriage 305 can be mated with an enclosed hauler for transporting freight, livestock, and so on.

Additionally, as shown in FIGS. 3A and 3B the passenger compartment 300 is a fifth-wheel configuration. That is, the passenger compartment 300 includes an additional axle and wheels 310. In an alternative embodiment, the passenger compartment 300 includes no wheels or axles and is instead supported by, for example, retractable feet when not docked with the removable carriage 305. In either case, the passenger compartment 300 includes seating and other amenities as may be expected within a passenger compartment of an automobile. In one example, the passenger compartment 300 is configured with multiple doors (not illustrated) for passengers to access the passenger compartment 300.

Furthermore, the passenger compartment 300, in one embodiment, includes one or more of the various vehicle systems 140 for controlling and/or interacting with the removable carriage 305. Moreover, the passenger compartment 300 includes, in one embodiment, one or more sensors of the sensor systems 120 that can be used in combination with sensors of the sensor system 120 that are integrated with the removable carriage 305. Additionally, the passenger compartment 300 also includes, in one embodiment, a secondary energy source such as a battery to power the noted systems when detached from removable carriage 305. The passenger compartment 300 includes, for example, one or more computing devices such as the processor 110, the planning system 170, the data store 115, and so on.

The removable carriage 305 is generally an interchangeable modular unit that docks/connects with the passenger compartment 300 to provide autonomous mobility to the passenger compartment 300. That is, for example, the passenger compartment 300 provides a request for a removable carriage 305 whenever a passenger wishes to be transported to a destination. Thus, the removable carriage 305 can autonomously navigate to the passenger compartment 300, dock with the passenger compartment 300, and then travel to an indicated destination as a combined unit embodied as the vehicle 100.

As shown in FIG. 3B, the removable carriage 305 docks with the passenger compartment 300 using hitches 315 and a connector 320. The hitches physically secure the removable carriage 305 to the passenger compartment 300. Additionally, the connector 320 may also be a physical connector such as a hitch, but additionally provides an electronic data link between the passenger compartment 300 and the removable carriage 305 via a port 325. Accordingly, information and control signals can be passed between the carriage 305 and the passenger compartment 300. Furthermore, the carriage 305 generally includes a drivetrain, a chassis, axles, wheels, brakes, and at least one engine for providing propulsion. In one embodiment, the at least one engine is powered according to an energy source such as, for example, electric, hydrogen, gasoline, diesel or another suitable energy source.

As previously noted, the carriage 305 includes various sensor systems 120 along with additional vehicle systems 140, and, for example, an autonomous driving module 160 such that the removable carriage 305 can operate autonomously to travel between various destinations without control input from a driver (e.g., a human). Accordingly, in one embodiment, the carriage 305 is dispatched by the planning system 170 (as included within the passenger compartment 300 or another separate device) to rendezvous with the passenger compartment 300. Thus, the carriage 305 may travel from a depot that queues multiple separate removable carriages 305 to a determined rendezvous point.

Once at the rendezvous point, the dispatched removable carriage 305 can replace a depleted carriage 305 that was previously transporting the passenger compartment 300. In general, the process of swapping carriages 305 is autonomous and does not involve manual intervention by a passenger or other user. Thus, the depleted carriage 305 can detach from the passenger compartment 300 leaving the passenger compartment supported by one or more support legs 330. The depleted carriage 305 can then, for example, autonomously navigate back to the noted depot for refueling/recharging or for mechanical evaluation. Thus, the depleted carriage 305 generally retains sufficient energy for a return trip to the depot. Additionally, the dispatched carriage 305 which is fully fueled/charged can autonomously dock with the passenger carriage 300 and then proceed with a route 260 on which the passenger compartment 300 was previously embarked to progress toward a planned destination.

Figure 4:
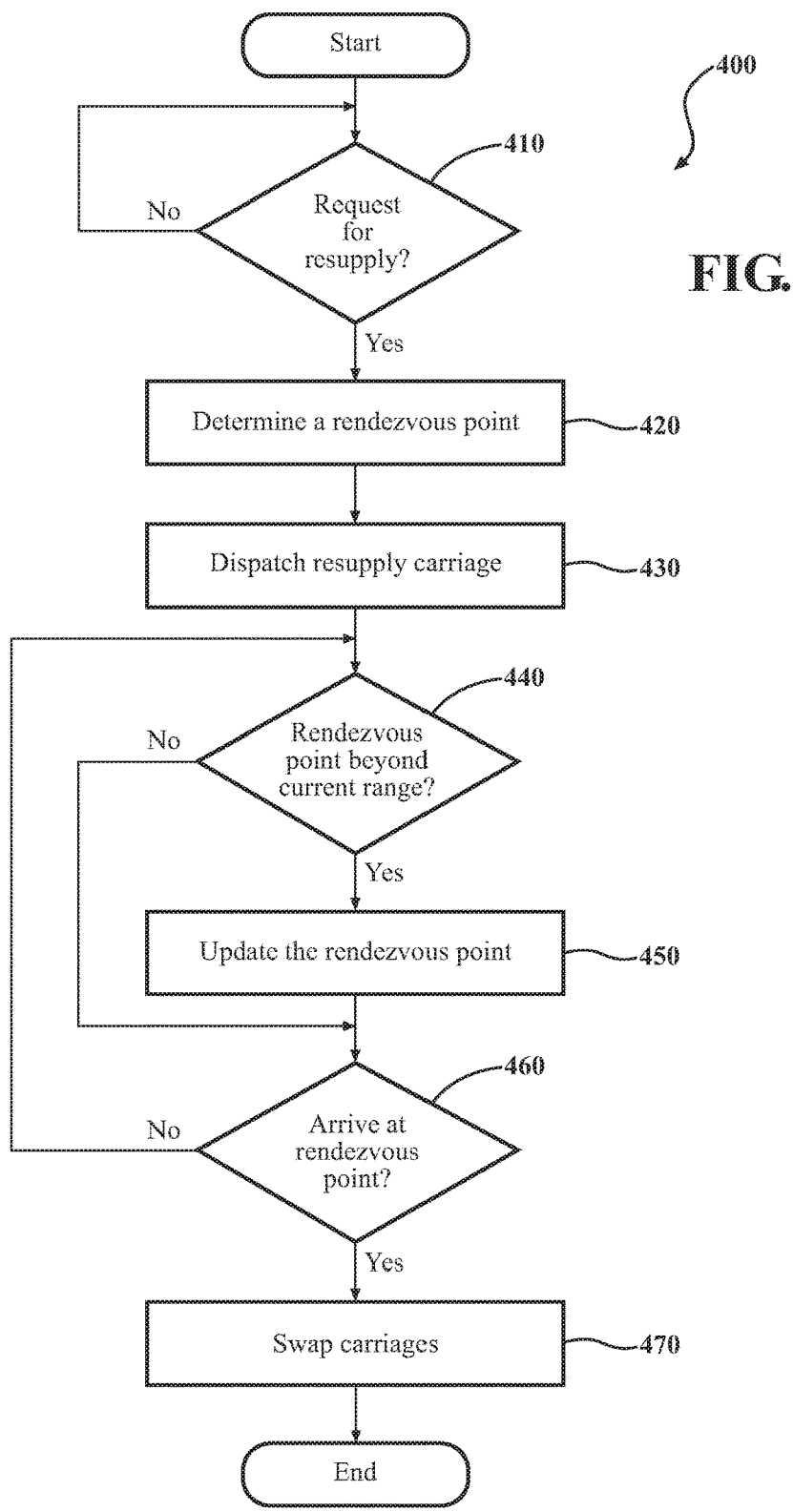
FIG. 4 illustrates a flowchart of one embodiment of a method that is associated with determining rendezvous points to swap a charged/fueled resupply carriage with a current removable carriage along a route.

Additional aspects of determining rendezvous points and swapping removable carriages will be discussed in relation to FIG. 4. FIG. 4 illustrates a method 400 associated with determining rendezvous points and automatically swapping removable carriages to resupply the vehicle 100 with energy. Method 400 will be discussed from the perspective of the planning system 170 of FIGS. 1 and 2. While method 400 is discussed in combination with the planning system 170, it should be appreciated that the method 400 is not limited to being implemented within the planning system 170, but is instead one example of a system that may implement the method 400. Moreover, it should be appreciated that aspects of the planning system 170 and of the method 400 may be implemented, in one embodiment, in a distributed manner such that separate functionality is provided as a cloud-based service and/or from a centralized server that is separate from the vehicle 100.

At 410, the monitor module 220 monitors for a request to resupply the vehicle 100. In one embodiment, the request is a request initiated from the navigation system 147 in response to a destination being electronically provided to the navigation system 147. The request can also be, for example, a manual electronic input from a passenger of the vehicle 100 requesting a resupply carriage, a request from one or more of the vehicle systems 140 in response to a mechanical issue, a request in response to a low energy state that was not otherwise expected, and so on. In general, the request is an initiating event from which the planning system 170 proceeds with method 400. The request may be initiated locally within the vehicle 100 or remotely from another electronic device (e.g., smartphone, cloud-based server, monitoring center, etc.). When initiated locally, the request originates from, for example, a passenger interface device, the processor 110, one or more of the vehicle systems 140, one or more of the sensor systems 120, or, more generally, from any component of the vehicle 100 that indicates an event for which the carriage 305 is to be replaced.

Additionally, the request itself can include information that is stored and used by the planning system 170. For example, the request can include a destination location, a tentative route to the destination location, an indication of passenger preferences (e.g., a particular rendezvous point), passenger requests (e.g., bathroom, food, etc.), and so on. In either case, the request is an electronic signal that is received by the monitor module 220 and which initiates the determination of a rendezvous point for swapping the carriage 305 for a resupply carriage 305.

At 420, the route module 230 determines a rendezvous point for meeting the vehicle with a resupply carriage 305. The rendezvous point is a geographic location that is where the vehicle 100 meets a fueled/charged removable carriage 305 (also referred to as a resupply carriage). Thus, in one embodiment, the route module 230 dynamically determines a rendezvous point according to various inputs. Alternatively, in one embodiment, the route module 230 selects the rendezvous point according to a function that assesses separate characteristics of different possible rendezvous points, various attributes of the vehicle 100, and indicated conditions/preferences.

For example, the route module 230 calculates the rendezvous point according to a route 260 of the vehicle 100, the current range (i.e., distance that can be traveled on current available energy), a return distance to a depot (i.e., base location of the removable carriage 305 where recharging/refueling and storage occurs), and one or more selected attributes of the rendezvous point. In one embodiment, the route module 230 also considers a type of the resupply carriage (e.g., electric drive, combustion engine, etc.), traffic conditions for expected arrival times, in addition to other factors that influence travel times and an overall experience of passengers of the vehicle (e.g., safety, availability of accommodations, etc.).

In either case, the route module 230 determines the rendezvous point by separately weighing the various factors to select the rendezvous point to account for a best-fit for the vehicle 100. For example, the planning system 170 can select the rendezvous point to minimize deviation from the route 260, to minimize added trip time for swapping the carriage 305, to prioritize safety, to prioritize amenities at the rendezvous point (e.g., availability of food), or to prioritize another specified factor. In either case, the route module 230 selects, for example, a set of statistical weighting values for each of the various factors and analyzes a plurality of available rendezvous points within a locality accordingly. Consequently, the route module 230 selects whichever one of the rendezvous points 250 that best fits the selected criteria (e.g., a lowest score).

Moreover, while a single rendezvous point is discussed, in one embodiment, the route module 230 determines several rendezvous points at once for a trip that includes multiple refuelings/rechargings. In this way, the planning system 170 can allocate resupply carriages 305 beforehand and the resupply carriages 305 can, for example, be staged at the selected rendezvous points. Additionally, the route module 230, upon determining the rendezvous point, modifies the route 260 such that an intermediate waypoint is added for the rendezvous point. Accordingly, depending on the particular rendezvous point, the route 260 of the vehicle 100 may be altered to meet up with the carriage 305.

At 430, the route module 230 dispatches the resupply carriage to meet the vehicle 100 at the rendezvous point. In one embodiment, the route module 230 provides a communication to the carriage to initiate the carriage to navigate to the rendezvous point autonomously. Accordingly, the route module 230, in one embodiment, selects the resupply carriage from a plurality of available carriages. The route module 230 can select a particular one of the carriages according to proximity, available features, and so on. In either case, the route module 230 provides the rendezvous point with the communication along with, for example, an expected time of arrival. In another embodiment, the route module 230 provides periodic updates to the resupply carriage about a progress of the vehicle 100 along the route 260 toward the rendezvous point. In this way, the resupply carriage can meet the vehicle 100 at the rendezvous point when the vehicle 100 arrives.

Alternatively, the route module 230 dispatches the carriage at 430 by providing an electronic query to a dispatching service. Thus, the route module 230 provides a wireless communication via a cellular network or other suitable communication network to the dispatch service, which selects and dispatches the resupply carriage to the rendezvous point. While dispatching the resupply carriage is discussed as occurring at block 430, it should be appreciated that dispatching the resupply carriage to meet the vehicle 100 can occur at any point while the vehicle 100 is in route to the rendezvous point. However, in general, the route module 230 initiates the resupply carriage to be dispatched such that the resupply carriage is at the rendezvous point upon arrival of the vehicle 100.

At 440, the monitor module 220 monitors a current range of the vehicle 100 to determine whether the rendezvous point can be reached as the vehicle 100 progresses along the route 260. In one embodiment, the monitor module 220 dynamically calculates the current range of the vehicle 100 as the vehicle 100 progresses along the route. For example, the monitor module 230 uses a current level of energy (e.g., charge, gasoline, hydrogen, etc.) that is present in the vehicle 100 along with a moving average of the operating efficiency of the vehicle (e.g., miles per gallon) and calculates the current range as a distance. In one embodiment, the monitor module 220 uses learned operating efficiencies over different segments of a roadway as part of the calculation of the current range.

Additionally, because various operating conditions can cause the current range of the vehicle 100 to vary, the monitor module 220 tracks the current range to ensure the rendezvous point does not become unreachable. For example, when various circumstances such as traffic jams, unexpected deviations from the route 260, energy leaks, or some other circumstance that affects the current range occurs, the rendezvous point can become unreachable. Thus, when this circumstance occurs, the monitor module 220 provides an electronic indication that causes the planning system 170 to proceed with processing as specified at block 450.

At 450, the route module 230 updates the rendezvous point. In one embodiment, the route module 230 updates the rendezvous point when, as previously noted, a level of energy (e.g., battery charge, gasoline, etc.) indicates that the rendezvous point is beyond the current range of the vehicle. To update the rendezvous point, the route module 230 executes, for example, the same determination as previously discussed in relation to block 420 except by using updated information such as the current range of the vehicle 100.

Additionally, updating the rendezvous point at 450 also includes, in one embodiment, electronically communicating a notice to the resupply carriage that is to meet the vehicle 100. Accordingly, the route module 230 directly communicates with the carriage or provides a notification to the dispatch service about the updated rendezvous point. In this way, the planning system 170 accounts for variations in operating conditions of the vehicle 100 and ensures that the vehicle 100 does not become stranded while in route to the rendezvous point.

At 460, the monitor module 220 determines whether the vehicle 100 has arrived at the rendezvous point. If the vehicle 100 has not arrived, then the monitor module 220 continues to check whether the rendezvous point is still within the current range of the vehicle 100. Otherwise, the monitor module 220 provides an electronic signal to the route module 230 that the vehicle 100 has arrived at the rendezvous point.

Consequently, at 470, the route module 230 controls the vehicle 100 to swap a current carriage for a resupply carriage in order to refuel/recharge the vehicle 100. In one embodiment, route module 230 controls the vehicle 100 to autonomously detach the current carriage and dock with the resupply carriage. Accordingly, the vehicle 100 obtains a charged/fueled carriage and can continue along the route 260 with minimal delay from the swapping.

Figure 5:
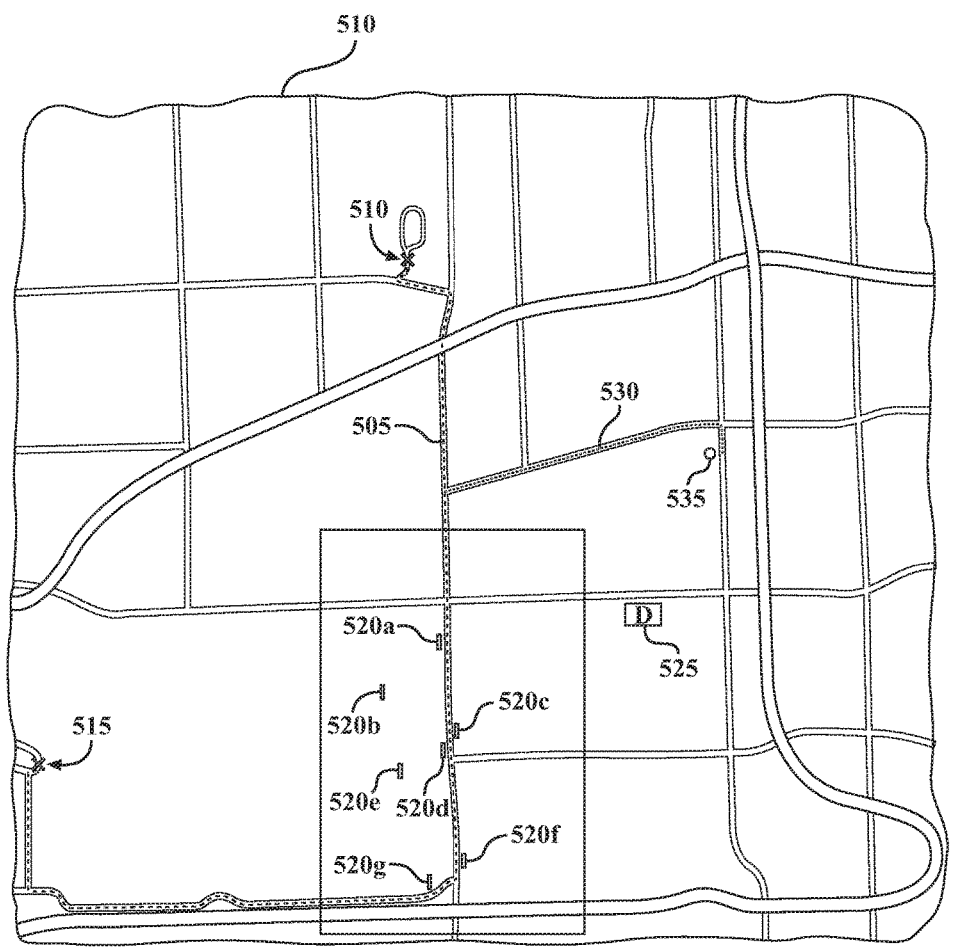
FIG. 5 illustrates a map of an example route that may be generated according to systems and methods disclosed herein.

As a further example of how the planning system 170 can operate, consider FIG. 5, which illustrates a map 500. The map 500 is illustrated with a route 505 for the vehicle 100. The route 505 begins at a point 510 and follows roadways to a destination location 515. Accordingly, upon the vehicle 100 receiving an indication of the destination 515 and the route 505 via, for example, an electronic communication from the navigation system 147, the route module 230 proceeds to determine a rendezvous point. Of course, not all routes will provide a reason for determining a rendezvous point. That is, in one embodiment, the monitor module 220 first assesses whether the current range of the carriage 305 is sufficient to reach the destination 515 or if there is another indicated reason (e.g., mechanical, user preference, etc.) for determining a rendezvous point to swap the carriage 305. Thus, if monitor module 220 determines that the current range of the vehicle 100 is sufficient to reach the destination 515, then a rendezvous point may not be calculated. However, for purposes of this explanation, we will assume that the current range is insufficient.

Thus, as shown in FIG. 5, multiple pre-defined rendezvous points 520a, 520b, 520c, 520d, 520e, 520f, and 520g, are available. Of course, while pre-defined rendezvous points are used for purposes of discussion, in one embodiment, the route module 230 can dynamically determine locations that are usable as rendezvous points. In either case, the route module 230 identifies the rendezvous points 520 according to, for example, a lookup using a bounding box of an area around the route 505 that is near a terminal end of the current range. For example, the route module 230 uses the current range to determine a general area near the route 505 in which the rendezvous point can be located. After identifying the rendezvous points that fall within this bounding box using, for example, an r-tree lookup, the route module 230 applies weighing factors to the separate attributes (e.g., deviation from route, distance to a depot 525, amenities, safety, etc.) of the individual rendezvous points to rank the rendezvous points according to a best-fit statistical function.

Thereafter, the route module 230 selects the best-ranked rendezvous point (e.g., point 520g) and provides a communication to dispatch a resupply carriage to the determined rendezvous point. Subsequently, as the vehicle 100 is traveling along the route 505, the monitor module 220 monitors the current range of the vehicle 100 to identify any fluctuations in the current range that indicate the rendezvous point 520g is no longer reachable. In one example, the vehicle 100 deviates from the route 505 along a side-route 530 toward an intermediate destination 535. Accordingly, the monitor module 220 detects the deviation and change to the current range of the vehicle 100 along the route 505. Consequently, the monitor module 220 causes the route module 230 to recalculate the rendezvous point and provide a rendezvous point that is within the current adjusted range (e.g., 520e).

Once the vehicle 100 arrives at the rendezvous point 520e, a depleted carriage that is currently docked with the vehicle 100 detaches and autonomously navigates back to the depot 525. Furthermore, a resupply carriage that is waiting at the rendezvous point 520e is controlled by the planning system 170 to autonomously dock with the vehicle 100 (i.e., passenger compartment) and then proceed along the route 505. Accordingly, the resupply carriage provides a resupply of energy (e.g., fuel and/or charged battery) so that the vehicle 100 can continue along the route 505 without seeking out a service station and waiting to recharge/refuel.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. Furthermore, the one or more data stores 115 and/or the memory 210 are, in one embodiment, distributed memories. That is, the data stores 115 and/or the memory 210 can be located remotely from the vehicle 100 and linked to the vehicle 100 through a wireless communication channel. Moreover, the distributed memory can be part of a cloud-based computing system that is provided to the vehicle 100 as part of a software as a service (SaaS).

The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors that are embodied as part of the carriage 305 and/or the passenger compartment 300. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. In one embodiment, sensors of the carriage 305 are combined with sensors of the compartment 300 to provide the sensor system 120 as a fusion of the disparate components. Thus, carriage 305 accesses sensors of the compartment 300 and vice versa so that a full three-hundred and sixty-degree array of sensors is available. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the planning system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the planning system 170, and/or the autonomous driving module(s) 160 may control some or all of these vehicle systems 140 and, thus, may be partially or fully autonomous.

The processor(s) 110, the planning system 170, and/or the autonomous driving module(s) 160 can be operatively connected to communicate with the various vehicle systems 140 and/or individual components thereof. For example, returning to FIG. 1, the processor(s) 110, the planning system 170, and/or the autonomous driving module(s) 160 can be in communication to send and/or receive information from the various vehicle systems 140 to control the movement, speed, maneuvering, heading, direction, etc. of the vehicle 100. The processor(s) 110, the planning system 170, and/or the autonomous driving module(s) 160 may control some or all of these vehicle systems 140.

The processor(s) 110, the planning system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the planning system 170, and/or the autonomous driving module(s) 160 can control the direction and/or speed of the vehicle 100. The processor(s) 110, the planning system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the planning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Accordingly, the computer-readable storage medium is, in one embodiment, a distributed memory that is remotely located from a system (e.g., the system 170) and spread across one or more remote devices. Moreover, the distributed memory is generally linked with the system 170 via a communication channel such as a wireless (e.g., cellular, WLAN, etc.) or wired communication channel (e.g., optical fiber channel, coax channel, etc.). Furthermore, the distributed memory is provided, in one embodiment, as part of a Software as a Service (SaaS).

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A planning system of a vehicle that is comprised of a passenger compartment that is removably attached to a current carriage, wherein the current carriage and a resupply carriage are interchangeable propulsion sources for the vehicle, the planning system comprising:
one or more processors;
a memory communicably coupled to the one or more processors and storing:
a route module including instructions that when executed by the one or more processors cause the one or more processors to, in response to a request for resupplying the vehicle with energy, determine a rendezvous point for meeting the vehicle with the resupply carriage,
wherein the route module includes instructions to dispatch the resupply carriage to meet the vehicle at the rendezvous point by providing an electronic signal to the resupply carriage to cause the resupply carriage to autonomously travel to the rendezvous point, and wherein the route module includes instructions to control the vehicle to swap the current carriage for the resupply carriage to supply energy to the vehicle.

2. The planning system of claim 1, further comprising:
a monitor module including instructions that when executed by the one or more processors cause the one or more processors to, after determining the rendezvous point, monitor a current range of the vehicle while the vehicle is in route to the rendezvous point to identify deviations in the route and whether a level of energy presently in the vehicle is sufficient to reach the rendezvous point, and
wherein the route module further includes instructions to update the rendezvous point when the level of energy is insufficient for the vehicle to reach the rendezvous point.

3. The planning system of claim 1, wherein the route module further includes instructions to control the vehicle to swap the current carriage for the resupply carriage by controlling the vehicle to autonomously detach the current carriage and dock with the resupply carriage,
wherein the resupply carriage and the current carriage include at least an energy source, a chassis, a drivetrain, and an engine, and wherein the resupply carriage autonomously navigates to the rendezvous point.

4. The planning system of claim 1, wherein the route module further includes instructions to dispatch the resupply carriage by selecting the resupply carriage from a plurality of resupply carriages that are presently available according to at least a proximity of the resupply carriage to the rendezvous point.

5. The planning system of claim 1, wherein the vehicle is an electric vehicle and the resupply carriage provides a charged battery for the vehicle.

6. The planning system of claim 1, wherein the rendezvous point is a location defined by at least geographic coordinates, wherein the route module further includes instructions to determine the rendezvous point by calculating the location as a function of operating characteristics of the vehicle, and one or more selected attributes of the rendezvous point, and wherein the operating characteristics include one or more of a route, a current range of the vehicle, and a return distance to a depot for the current carriage.

7. The planning system of claim 6, wherein the route module further includes instructions to determine the rendezvous point by separately weighing the one or more selected attributes and the operating characteristics to select the rendezvous point according to a statistical weighing of a plurality of rendezvous points.

8. The planning system of claim 1, wherein the request includes a destination location for the vehicle and a tentative route of the vehicle.

9. A non-transitory computer-readable medium storing instructions that when executed by one or more processors cause the one or more processors to:
in response to a request for resupplying a vehicle with energy, determine a rendezvous point for meeting the vehicle with a resupply carriage;
dispatch the resupply carriage to meet the vehicle at the rendezvous point by providing an electronic signal to the resupply carriage to cause the resupply carriage to autonomously travel to the rendezvous point; and
control the vehicle to swap a current carriage for the resupply carriage to supply energy to the vehicle,
wherein the vehicle is comprised of a passenger compartment that is removably attached to the current carriage, and wherein the current carriage and the resupply carriage are interchangeable propulsion sources for the vehicle.

10. The non-transitory computer-readable medium of claim 9, further comprising instructions to:
after determining the rendezvous point, monitor a current range of the vehicle while the vehicle is in route to the rendezvous point to identify deviations in the route and whether a level of energy presently in the vehicle is sufficient to reach the rendezvous point, and
update the rendezvous point when the level of energy is insufficient for the vehicle to reach the rendezvous point.

11. The non-transitory computer-readable medium of claim 9, wherein the instructions to control the vehicle to swap the current carriage for the resupply carriage include instructions to control the vehicle to autonomously detach the current carriage and dock with the resupply carriage,
wherein the resupply carriage and the current carriage include at least an energy source, a chassis, a drivetrain, and an engine, and wherein the resupply carriage autonomously navigates to the rendezvous point.

12. The non-transitory computer-readable medium of claim 9, wherein the vehicle is an electric vehicle and the resupply carriage provides a charged battery for the vehicle,
wherein the rendezvous point is a location defined by at least geographic coordinates, wherein the instructions to determine the rendezvous point include instructions to calculate the location as a function of operating characteristics of the vehicle, and one or more selected attributes of the rendezvous point, and wherein the operating characteristics include one or more of a route, a current range of the vehicle, and a return distance to a depot for the current carriage.

13. The non-transitory computer-readable medium of claim 12, wherein the instructions to determine the rendezvous point include instructions to separately weigh the one or more selected attributes and the operating characteristics to select the rendezvous point according to a statistical weighing of a plurality of rendezvous points.

14. A method of resupplying a vehicle that is comprised of a passenger compartment that is removably attached to a current carriage, wherein the current carriage and a resupply carriage are interchangeable propulsion sources for the vehicle, the method comprising:
in response to a request for resupplying the vehicle with energy, determining a rendezvous point for meeting the vehicle with the resupply carriage;
dispatching the resupply carriage to meet the vehicle at the rendezvous point by providing an electronic signal to the resupply carriage to cause the resupply carriage to autonomously travel to the rendezvous point; and
controlling the vehicle to swap the current carriage for the resupply carriage to supply energy to the vehicle.

15. The method of claim 14, further comprising:
after determining the rendezvous point, monitoring a current range of the vehicle while the vehicle is in route to the rendezvous point to identify deviations in the route and whether a level of energy presently in the vehicle is sufficient to reach the rendezvous point; and
updating the rendezvous point when the level of energy is insufficient for the vehicle to reach the rendezvous point.

16. The method of claim 14, wherein controlling the vehicle to swap the current carriage for the resupply carriage includes controlling the vehicle to autonomously detach the current carriage and dock with the resupply carriage,
wherein the resupply carriage and the current carriage include at least an energy source, a chassis, a drivetrain, and an engine, and wherein the resupply carriage autonomously navigates to the rendezvous point responsive to the vehicle dispatching the resupply carriage.

17. The method of claim 14, wherein dispatching the resupply carriage includes selecting the resupply carriage from a plurality of resupply carriages that are presently available according to at least a proximity of the resupply carriage to the rendezvous point.

18. The method of claim 14, wherein the rendezvous point is a location defined by at least geographic coordinates, wherein determining the rendezvous point includes calculating the location as a function of operating characteristics of the vehicle, and one or more selected attributes of the rendezvous point, and wherein the operating characteristics include one or more of a route, a current range of the vehicle, and a return distance to a depot for the current carriage.

19. The method of claim 18, wherein calculating the rendezvous point includes separately weighing the one or more selected attributes and the operating characteristics to select the rendezvous point according to a statistical weighing of a plurality of rendezvous points.

20. The method of claim 14, wherein the request includes a destination location for the vehicle and a tentative route of the vehicle, and wherein the vehicle is an electric vehicle, and the resupply carriage provides a charged battery for the vehicle.

\* \* \* \* \*